United States Patent
Wille

(10) Patent No.: US 7,136,482 B2
(45) Date of Patent: Nov. 14, 2006

(54) PROGRESSIVE ALERT INDICATIONS IN A COMMUNICATION DEVICE

(75) Inventor: Daniel J. Wille, Silver Spring, MD (US)

(73) Assignee: Motorola, Inc., Schaumburg, IL (US)

( * ) Notice: Subject to any disclaimer, the term of this patent is extended or adjusted under 35 U.S.C. 154(b) by 86 days.

(21) Appl. No.: 10/973,531

(22) Filed: Oct. 26, 2004

(65) Prior Publication Data

US 2006/0088153 A1   Apr. 27, 2006

(51) Int. Cl.
*H04M 1/00* (2006.01)

(52) U.S. Cl. .......................... 379/373.02; 379/373.01; 455/458; 455/567

(58) Field of Classification Search .......... 379/373.01, 379/373.02; 455/458, 567
See application file for complete search history.

(56) References Cited

U.S. PATENT DOCUMENTS

| | | | |
|---|---|---|---|
| 5,696,497 A | 12/1997 | Mottier | |
| 5,870,684 A | 2/1999 | Hoashi | |
| 6,084,959 A * | 7/2000 | Yun | 379/373.02 |
| 6,255,937 B1 | 7/2001 | Hamaguchi | |
| 6,408,187 B1 * | 6/2002 | Merriam | 455/458 |
| 6,675,026 B1 | 1/2004 | Yoon | |
| 6,774,769 B1 | 8/2004 | Okada | |
| 6,928,306 B1 | 8/2005 | Matsuda | |
| 2002/0010008 A1 | 1/2002 | Bork | |
| 2006/0014569 A1 * | 1/2006 | DelGiorno | 455/567 |

* cited by examiner

*Primary Examiner*—Jefferey F. Harold
(74) *Attorney, Agent, or Firm*—Brian M. Mancini; Indira Saladi; Terri S. Hughes

(57) ABSTRACT

A communication device and method for providing progressive alert indications includes a first step of storing at least one alert indication in the communication device. The alert indication can include ring tones, vibrations, and lights. A next step includes detecting an incoming call to the communication device. A next step includes generating a progression of alert indications wherein each alert indication in the progression is different from the previous alert indication. The progression can include escalating loudness, repetitions, vibrations, lighting, or provide different ring tones. A next step includes terminating the progressive alert indications upon reaching a predefined maximum number of alerts and repeating the last alert indication for all subsequent alert indications.

20 Claims, 2 Drawing Sheets

US 7,136,482 B2

PROGRESSIVE ALERT INDICATIONS IN A COMMUNICATION DEVICE

FIELD OF THE INVENTION

The present invention relates to communication devices and more specifically, to alert indications in a communication device.

BACKGROUND OF THE INVENTION

Communication devices, such as wireline telephones, cordless telephones, and mobile or portable radio communication devices (e.g. cellular telephones), all use alert indications of some type to notify a user that there is an incoming call. Typically, these alert indications include a ring tone or a vibration that is repeated at periodic intervals. For example, a bell tone can be sounded for one second followed by silence for one second, which is repeated until the incoming call is answered. With more advanced electronics, it is now possible for a user to provide their own recorded audible alert (e.g., music, tones, voice, etc.) that can be stored in their telephone to use as an alert indication. In each case, the same alert indication is repeated periodically until the call is answer.

A problem arises in situations where a user does not hear the first alert indication from an incoming call. For example, this can occur when someone is entering a house while the phone is ringing, or someone does not notice a vibration of a cellular phone if that phone is not actually on their person. In these cases, the user is not aware of how long the phone has been ringing and must quickly decide whether to hurry to answer the call before the caller hangs up the call or until a recoding device answers the call. This creates a stressful situation for many people. One solution to the problem, in the case of cellular phones with a vibratory alert mode, is to program the phone to vibrate first, and then use repetitive ring tones thereafter. However, this solution only really addresses the problem of whether a user can feel a vibratory alert. It does not address how a user can tell how long the phone has been ringing after the first alert since the subsequent ring tones are all the same.

What is needed is a solution that will give a user the ability to quickly detect how long a telephone has been ringing, wherein the user can decide whether to rush to answer the telephone or not. It would also be of benefit to provide this solution easily without adding significantly to the hardware or cost of the telephone.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides a solution that will give a user the ability to quickly detect how long a telephone has been ringing, wherein the user can decide whether to rush to answer the telephone or not. The solution can be easily implemented solely in the software of the telephone without adding significantly to the cost of the telephone.

Figure 1:
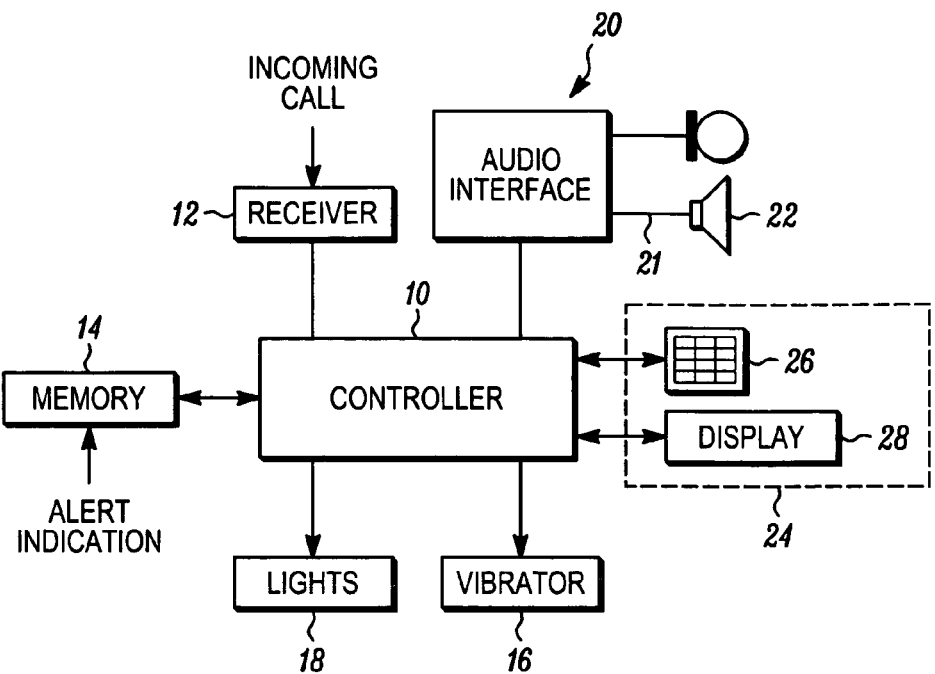
FIG. 1 shows a block diagram of a system overview, in accordance with the present invention.

Referring to FIG. 1, a communication device with progressive alert indications is shown. The communication device can include a controller 10, a memory 14, an audio interface 20 that includes a speaker or alert 22, a user interface 24 that includes a keypad 26 and a display 28, and a receiver 12. Optionally, the communication device can include a vibrator 16 and indicator lights 18. The controller 10 is coupled to and controls each of these elements.

The example used herein is for a cellular radio communication device. However, the present invention is equally applicable to wireline telephones, cordless telephones and mobile radio communication devices. Therefore, the receiver 12 as used herein can be a simple wireline telephone receiver that is connected through wires to a local phone service, it can be a radio communication receiver with the necessary components (e.g., antenna, mixer, amplifier, filters, etc.) to receive a wireless signal.

The present invention includes at least one alert indication that is stored in the memory 14. When the controller 10 detects an incoming call through the receiver 12, the controller 10 generates a progression of alert indications 21 through the audio interface 20 wherein each alert indication in the progression is different from the previous alert indication. Due to a limited memory, it may be necessary for the controller 10 to terminate the progressive alert indications 21 upon reaching a predefined maximum number of alerts and repeat the last alert indication for all subsequent alert indications. In wireline applications, where the telephone company supplies and controls the actually ring tone of the telephone, it is necessary that the controller bypass the telephone company ring tones and supply the alert indications directly.

The alert indications themselves can consist of a single ring tone, a plurality of different ring tones, a quickly repeated ring tone, a vibration, an indicator light or synthesized or recorded music or voice. The ring tone(s) can include not only a bell or tone, but also any audio element including a bell, a tone, a voice recording, a music recording, and the like. The vibration can be provided by a vibration device that is controllable as far as a period of vibration time and an amplitude of vibration. The indicator light can be an existing light such as a keypad or display backlight or can be specially provided as an indicator function. The lights are controllable as far as lighting time, flashing, sequence of lighting, color, and the like.

The progression of alert indication escalates as the number of alert indications (i.e. rings) increases. In this way, each individual alert is unique from the others. In the simplest embodiment, the alert indicator is a single ring tone (e.g. bell, tone, music voice, etc.) wherein, upon receiving an incoming call through the receiver 12, the controller 10 generates through the audio interface 20 an increasing loudness of the ring tone for each successive alert indication. For example, when there is a call, the first ring tone can be set for −30 dBm, the next ring tone at −27 dBm, the next ring tone at −24 dBm, and on, until the call is picked up, the call is transferred to a recording device, or the caller hangs up. Of course, there are limitations as to how loud a tone can be generated by the telephone, and the progressive sequence of tones can be terminated at a defined loudness limit where all subsequent tones are played at that limit. This embodiment has the advantage of using a single seed alert tone, which already exists in the memory, and which is modified by the controller for loudness on the sequence of alerts until the call is answered.

In another embodiment, the alert indicator is a ring tone that can be repeated, and wherein upon receiving an incoming call through the receiver the controller generates through the audio interface an incrementing repetition of the ring tone for each successive alert indication. For example, when there is a call, the first ring tone can be set for a short burst of a tenth of a second followed by a pause of one second. The next ring tone can be set for two short bursts of a tenth of a second each followed by a pause of one second. The next ring tone has three short bursts, and on, until the call is answered. This embodiment has the advantage of using a single seed alert tone, which already exists in the memory, and which is modified by the controller for number of repetitions on the sequence of alerts without practical limit.

In another embodiment, the alert indicator is a ring tone that can be lengthened, and wherein upon receiving an incoming call through the receiver the controller generates through the audio interface a lengthening ring tone for each successive alert indication. For example, when there is a call, the first ring tone can be set for a one second tone followed by a pause of one second. The next ring tone can be set for a two second tone followed by a pause of one second. The next ring tone has three second tone, and on, until the call is answered. This embodiment has the advantage of using a single seed alert tone, which already exists in the memory, and which is modified by the controller for length on the sequence of alerts without practical limit.

In another embodiment, the alert indicator is an actuation of the vibrator that can be modified, such as through an increasing of amplitude, frequency, or length of vibration, and wherein upon receiving an incoming call through the receiver the controller generates through the vibrator a modified vibratory alert for each successive alert indication. For example, when there is a call, the first alert can be set for a one second vibration followed by a pause of one second. The next alert can be set for a two second vibration followed by a pause of one second, and on, until the call is answered. This embodiment has the advantage of using a single existing function as the alert indication, and which is modified by the controller for one or more of amplitude, frequency, and length on the sequence of alerts without practical limit.

In another embodiment, the alert indicator is an actuation of one or more lights that can be modified, such as through an increasing of flashing, brightness, color, number of lights, and length of on-time, and wherein upon receiving an incoming call through the receiver the controller generates through the lights a modified light indication for each successive alert indication. For example, when there is a call, the first alert can be a light that flashes every two seconds. The next alert can be a light that flashes every second. The next alert can be alight that flashes every half second, and on, until the call is answered. This embodiment has the advantage of using a single existing function as the alert indication, and which is modified by the controller for one or more of flashing, brightness, color, number of lights, and length of on-time on the sequence of alerts without practical limit.

In another embodiment, a plurality of alert indicators can be stored in memory, and wherein upon receiving an incoming call through the receiver the controller generates one of the plurality of alert indicators for each successive alert indication. For example, several different ring tones can be stored in memory and when there is a call, the first ring tone can be played through the audio interface, the second ring tone can be played through the audio interface, and on, until the call is answered. In addition, a combination of vibratory, audio, and light alert indications can be used during the progression. Preferably, the selection of the sequence of the progressions of alert indicators can be pre-defined by a user. This embodiment has the advantage of versatility at the expense of memory size. It should be recognized that the audio, vibratory, and light alerts as described above can all be programmed to operate concurrently with each other if desired.

The user interface 24 can be used for selecting alert indications to be stored in the memory. Alternatively, the alert indications can be programmed externally and downloaded to the telephone. FIGS. 2–8 represent examples of several possible menu selections that can be used to program progressive alerts into a communication device. Each menu can be shown on a display of the communication device (28 in FIG. 1) and entries can be selected by the user using a keyboard (26 in FIG. 1), for example. Of course, it should be recognized that many different menus can be presented, and the figures are presented by way of example only.

Figure 2:
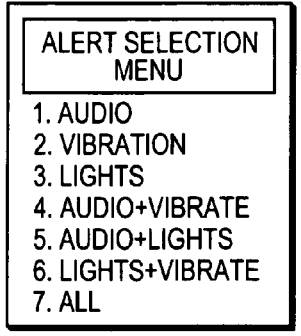
FIG. 2 shows a first menu application in a cellular telephone, in accordance with the present invention.

Referring to FIG. 2, the first menu screen allows a user to select from a list of available alert indicators present in the communication device. In the example shown, the communication device has an audio alert, vibration device, and indicator lights that can be programmed to alert upon an incoming call. The menu also allows a user to combine different alerts, as desired. If the user selects either of items one (audio) three (lights) or four through seven (audio and/or lights), then the user will be presented the further menu selections of FIGS. 3 and 4 to further specify the particular audio or light selection desired.

Figure 3:
FIG. 3 shows a second menu application in a cellular telephone, in accordance with the present invention.

FIG. 3 represents a further audio alert menu selection. If an audio alert was specified in the first menu (FIG. 2), then this menu is presented to a user to specify whether the audio alert should take the form of a ring tone, music, voice recording, other audio alert, or multiple audio selections.

Figure 4:
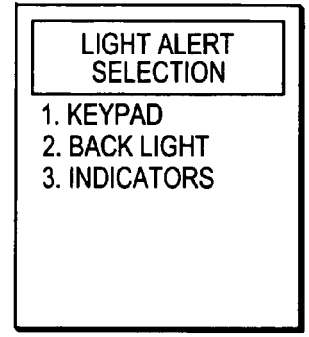
FIG. 4 shows a third menu application in a cellular telephone, in accordance with the present invention.

FIG. 4 represents a further light alert menu selection. If a light alert was specified in the first menu (FIG. 2), and there are various light systems that can be used as indicators, then this menu is presented to a user to specify whether the light alert should take the form of one of those indicators (e.g. keypad light, display back light, or dedicated light alerts. It is assumed that there is only one vibratory device in the communication device, so there is no vibrator selection menu presented in this example.

Figure 5:
FIG. 5 shows a fourth menu application in a cellular telephone, in accordance with the present invention.

FIG. 5 represents a menu to select the particular audio progression desired for the particular audio alert selected from FIG. 2. For example, if the user selected ring tones (item one of FIG. 2) for their audio alert, then the user can choose a progression that makes the ring tones continually louder (item one), provides increasing repetitions (item two), or the combination of continually louder increasing repetitions (item three). However, if the user selected multiple audio alerts (item five in FIG. 2) then the user will be presented with the multiple progression selection of FIG. 6 instead of the menu of FIG. 5).

Figure 6:
FIG. 6 shows an alternate fourth menu application in a cellular telephone, in accordance with the present invention.

FIG. 6 is a menu presented to a user to specify the audio alert sequence progression of multiple available audio alerts that are stored or can be generated. For example, the user can choose to combine the alerts of a ring tone (item one), voice recording (item two), and two music selections (items three and four) as an alert indicator progression during one incoming call. In the example shown, the first alert during an incoming call would be a ring tone, the second alert during the call would be a voice recording, the third alert during the call would be a first music selection, and the fourth and subsequent alerts during the call would be a second music selection. A user, knowing the sequence, could then determine how long the telephone has been ringing. In addition, aspects of the menu of FIGS. 5 and 6 can be combined wherein the individual items of FIG. 6 could be modified in their progression by menu item aspects of FIG. 5.

Figure 7:
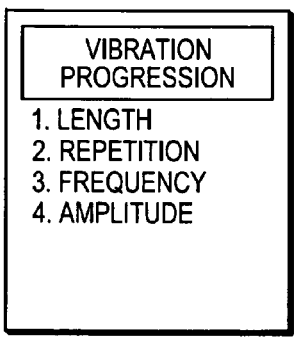
FIG. 7 shows a fifth menu application in a cellular telephone, in accordance with the present invention.

FIG. 7 represents a menu to select the particular vibratory progression desired if a vibratory selection was previously made (e.g. items two, four, six, or seven of FIG. 2). For example, if the user selected a vibration mode (item two of FIG. 2) for their audio alert, then the user can choose a progression that makes the vibrations continually longer (item one), provides increasing repetitions (item two), increases the frequency (item three), or increase the amplitudes (item four). Depending upon the vibratory device used, one or more of these options may not be available or may be redundant (e.g. frequency and amplitude).

Figure 8:
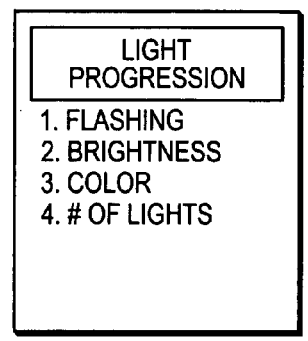
FIG. 8 shows a sixth menu application in a cellular telephone, in accordance with the present invention.

FIG. 8 represents a menu to select the particular lighting progression desired if a light selection was previously made (e.g. items three and five to seven of FIG. 2). For example, if the user selected a light alert mode (item three of FIG. 2) for their alert, then the user can choose a progression that makes the lights flash (item one), increasing brightness (item two), changing color (item three), or increase the number of lights (item four), or any combination thereof (not shown). Depending upon the light indicators used, one or more of these options may not be available.

Figure 9:
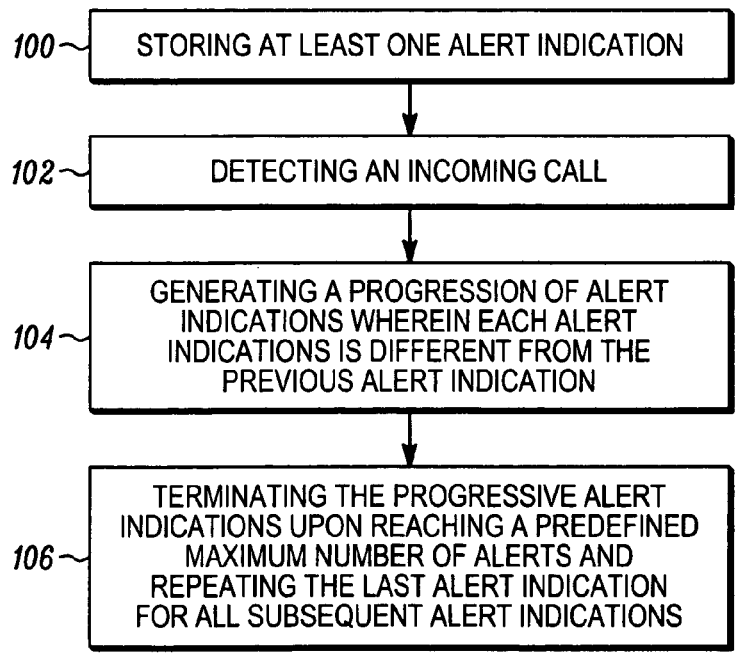
FIG. 9 is a flow chart of a method in accordance with the present invention.

The present invention also includes a method of providing progressive alert indications in a communication device upon receipt of an incoming call. Referring to FIG. 9, the method includes a first step 100 of storing at least one alert indication in the communication device. The alert indication can be a standard ring tone, a plurality of different ring tones, a quickly repeated ring tone, a vibration, an indicator light, recorded or synthesized music, recorded or synthesized voice, or other audio alert. The progression of alert indications for each incoming call can be generated individually for each ring or can be pre-store in a known sequence, such as by using a ".wav" or ".midi" file, for example. To save memory, it is preferred that only a single alert is stored and is modified as it goes through the progression of the alert indications for the call. The ring tone(s) can include not only a bell or tone, but also any audio element including a bell, a tone, a voice recording, a music recording, and the like. The vibration can be provided by a vibration device that is controllable as far as a period of vibration time and an amplitude of vibration. The indicator light can be an existing light such as a keypad or display backlight or can be specially provided as an indicator function. The lights are controllable as far as lighting time, flashing, sequence of lighting, color, and the like.

A next step 102 includes detecting an incoming call to the communication device.

A next step 104 includes generating a progression of alert indications wherein each alert indication in the progression is different from the previous alert indication until the call is answered or a terminating condition is met. The progression of alert indication escalates as the number of alert indications (i.e. rings) increases. In this way, each individual alert is unique from the others.

In the simplest embodiment, the alert indicator is a single ring tone (e.g. bell, tone, music voice, etc.) wherein, upon receiving an incoming call, the process generates an increasing loudness of the ring tone for each successive alert indication.

In another embodiment, the alert indicator is a ring tone that can be repeated, and wherein upon receiving an incoming call through the receiver the controller generates through the audio interface an incrementing repetition of the ring tone for each successive alert indication.

In another embodiment, the alert indicator is a ring tone that can be lengthened, and wherein upon receiving an incoming call through the receiver the controller generates through the audio interface a lengthening ring tone for each successive alert indication.

In another embodiment, the alert indicator is an actuation of the vibrator that can be modified, such as through an increasing of amplitude, frequency, or length of vibration, and wherein upon receiving an incoming call through the receiver the controller generates through the vibrator a modified vibratory alert for each successive alert indication.

In another embodiment, the alert indicator is an actuation of one or more lights that can be modified, such as through an increasing of flashing, brightness, color, number of lights, and length of on-time, and wherein upon receiving an incoming call through the receiver the controller generates through the lights a modified light indication for each successive alert indication.

In another embodiment, a plurality of alert indicators can be stored in memory, and wherein upon receiving an incoming call through the receiver the controller generates one of the plurality of alert indicators for each successive alert indication. Of course various other embodiment and combinations thereof can be utilized to the same effect in the present invention, wherein each alert in a call is different (progresses) from earlier alerts in order to indicate to a user how long the incoming call has gone unanswered.

A next step 106 includes terminating the progressive alert indications upon reaching a predefined maximum number of alerts and repeating the last alert indication for all subsequent alert indications.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method of providing progressive alert indications in a cellular telephone upon receipt of an incoming call, the method comprising the steps of:

storing at least one alert indication in the cellular telephone;

detecting an incoming call to the cellular telephone; and generating a progression of alert indications wherein each alert indication in the progression is different from a previous alert indication such that a user can identify how long the cellular telephone has been generating the progression of alert indications based on a current alert indication.

2. The method of claim 1, further comprising the step of terminating the progressive alert indications upon reaching a predefined maximum number of alerts.

3. The method of claim 1, wherein the storing step includes storing a ring tone that can be repeated as the alert indication, and wherein the generating step includes incrementing the repetitions of the ring tone for each successive alert indication.

4. The method of claim 1, wherein the storing step includes storing a ring tone that can be lengthened as the alert indication, and wherein the generating step includes lengthening the ring tone for each successive alert indication.

5. The method of claim 1, wherein the storing step includes storing a plurality of different ring tones as the alert indications, and wherein the generating step includes generating one of the plurality of ring tones for each successive alert indication.

6. The method of claim 1, wherein the storing step includes storing an actuation of a vibratory device in the cellular telephone as the alert indication, and wherein the generating step includes increasing the vibrations of the vibratory device for each successive alert indication.

7. The method of claim 1, wherein the storing step includes storing actuation of at least one light on the cellular telephone as the alert indication, and wherein the generating step includes changing the light actuation for each successive alert indication.

8. The method of claim 7, wherein the generating step includes increasing the number of light actuations for each successive alert indication.

9. A method of providing progressive alert indications in a communication device upon receipt of an incoming call, the method comprising the steps of:

storing at least one alert indication in the communication device;

detecting an incoming call to the communication device;

generating a progression of alert indications wherein each alert indication in the progression is different from a previous alert indication such that a user can identify how long the communication device has been generating the progression of alert indications based on a current alert indication.

10. The method of claim 9, wherein the storing step includes storing as the alert indication at least one of; a ring tone, a plurality of different ring tones, a ring tone that can be repeated, a ring tone that can be lengthened, an actuation of a vibratory device in the communication device, an actuation of at least one light on the communication device.

11. The method of claim 10, wherein the generating step includes incrementing the repetitions of the ring tone for each successive alert indication and concurrently changing the light actuation for each successive alert indication.

12. The method of claim 10, wherein the generating step includes generating one of the plurality of different ring tones for each successive alert indication and concurrently changing the light actuation for each successive alert indication.

13. The method of claim 10, wherein the generating step includes increasing the vibrations of the vibratory device for each successive alert indication and concurrently changing the light actuation for each successive alert indication.

14. A cellular telephone with progressive alert indications, the cellular telephone comprising;

at least one alert indication;

a memory for storing the at least one alert indication;

an audio interface for generating audio alert indications;

a user interface for selecting alert indications to be stored in the memory;

a receiver for receiving incoming calls; and a controller coupled to the memory, audio interface, user interface, receiver, and user interface, the controller detects an incoming call through the receiver, generates a progression of alert indications through the audio interface wherein each alert indication in the progression is different from the previous alert indication such that a user can identify how long the cellular telephone has been generating the progression of alert indications based on the current alert indication.

15. The device of claim 14, wherein the at least one alert indicator is a ring tone, and wherein upon receiving an incoming call through the receiver the controller generates through the audio interface an increasing loudness of the ring tone for each successive alert indication.

16. The device of claim 14, wherein the at least one alert indicator is a ring tone that can be repeated, and wherein upon receiving an incoming call through the receiver the controller generates through the audio interface an incrementing repetition of the ring tone for each successive alert indication.

17. The device of claim 14, wherein the at least one alert indicator is a ring tone that can be lengthened, and wherein upon receiving an incoming call through the receiver the controller generates through the audio interface an lengthened ring tone for each successive alert indication.

18. The device of claim 14, wherein the at least one alert indicator is a plurality of different ring tones, and wherein upon receiving an incoming call through the receiver the controller generates through the audio interface one of the plurality of ring tones for each successive alert indication.

19. The device of claim 14, further comprising a vibratory device coupled to the controller, wherein the at least one alert indicator is an actuation of the vibratory device, and wherein upon receiving an incoming call through the receiver the controller generates through the vibratory device an increasing the vibrations of the vibratory device for each successive alert indication.

20. The device of claim 14, further comprising at least one light coupled to the controller, wherein the at least one alert indicator is an actuation of the at least one light, and wherein upon receiving an incoming call through the receiver the controller changes the light actuation for each successive alert indication.

* * * * *